United States Patent [19]
Blaschke et al.

[11] 3,710,088
[45] Jan. 9, 1973

[54] PLANAR VECTOR ANALYZER

[75] Inventors: Felix Blaschke, Erlangen; Klaus Haken, Furth, both of Germany

[73] Assignee: Siemens Aktiengesellschaft, Berlin and Munich, Germany

[22] Filed: March 17, 1971

[21] Appl. No.: 125,131

[30] Foreign Application Priority Data

March 18, 1970 Germany..................P 20 12 781.5

[52] U.S. Cl. ..................235/189, 235/186, 235/197
[51] Int. Cl. ..............................................G06g 7/22
[58] Field of Search.......................235/186, 189, 197

[56] References Cited

UNITED STATES PATENTS

| | | | |
|---|---|---|---|
| 3,493,737 | 2/1970 | Edelson | 235/189 |
| 3,584,783 | 6/1971 | Kobori | 235/189 |
| 3,482,086 | 12/1969 | Caswell | 235/186 |
| 3,601,593 | 8/1971 | Preston | 235/197 X |
| 3,305,674 | 2/1967 | Cook | 235/189 |
| 3,457,394 | 7/1969 | Grado | 235/186 X |
| 3,496,565 | 2/1970 | Jenkins | 235/186 X |

OTHER PUBLICATIONS

"Primer on Analog Computation," EAI General Purpose Analog Computation, Bulletin No. ALAC 64002, 1964.

Korn and Korn, Electronic Analog Computers, McGraw-Hill Book Co., Inc., 1956, pp. 26–29.
CRC Standard Mathematical Tables, Fourteenth Edition, Chemical Rubber Co., 1965, p. 503.

*Primary Examiner*—Malcolm A. Morrison
*Assistant Examiner*—Jerry Smith
*Attorney*—Curt M. Avery, Arthur E. Wilfond, Herbert L. Lerner and Daniel J. Tick

[57] ABSTRACT

Analyzing apparatus for determining characteristic magnitudes of a planar vector with the aid of two dividers, each of which has a pair of inputs. One of each pair receives a voltage proportional to one of the two orthogonal vector components respectively. The output voltages of the two dividers are added, and the sum is compared with a constant voltage in the input circuitry of a regulator, preferably an integral regulator, whose output voltage is applied to the other two inputs of the respective quotient forming members. The respective outputs of the two dividers are connected to trigonometric-function generating circuitry of electronic computer type which has an output voltage indicative of the phase angle of the vector.

7 Claims, 5 Drawing Figures

PATENTED JAN 9 1973           3,710,088
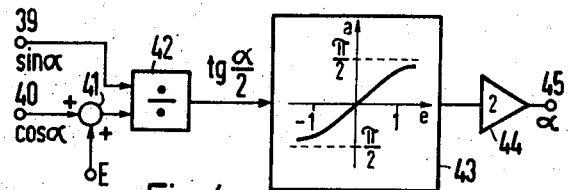
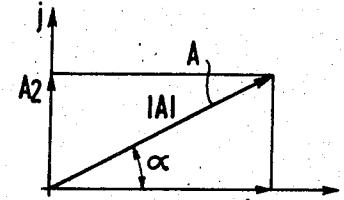
Fig.4         Fig.1
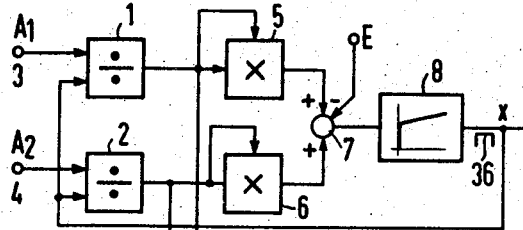
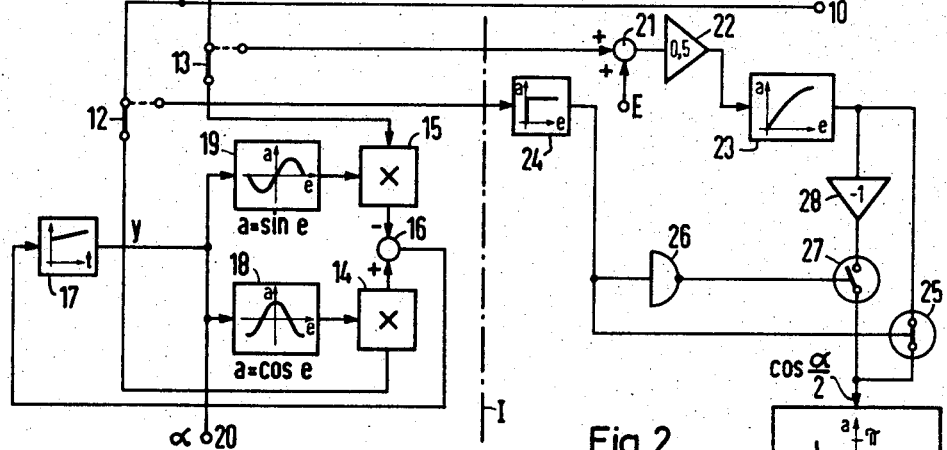
Fig.2
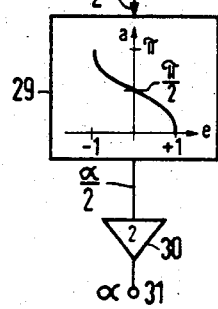
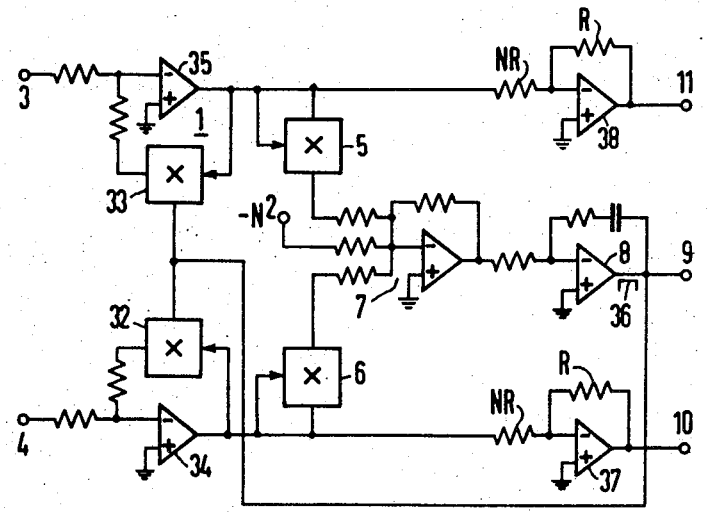
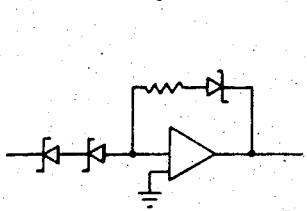
Fig.3     Fig.5

PLANAR VECTOR ANALYZER

DESCRIPTION OF THE INVENTION

Our invention relates to apparatus for indicating critical data of a planar vector. Such a vector analyzer comprises two dividers or stages such as divider modules in form of respective amplifiers with a negative feedback connection containing a multiplier. One output of each multiplier receives a voltage proportional to one of the two orthogonal vector components respectively. The output voltages of the multipliers are squared, the results added to each other, and the sum is compared with a constant voltage in the input circuit of a preferably integral regulator, whose output voltage is applied to the other two inputs of the respective dividers.

A system of this type affords determinating the scalar (absolute) amount of a vector as well as two orthogonal components of a unit vector which always points in the direction of the vector being analyzed.

It is in many cases desired, however, to also have the vector analyzer directly indicate the characteristic angular coordinate, that is, the phase angle, of the vector being analyzed; and it is a principal object of out invention to devise apparatus or systems which reliably meet this desideratum.

To this end, and in accordance with a feature of our invention, we basically retain the fundamental features of the above-mentioned known vector analyzer. That is, a vector analyzer according to our invention, like those heretofore known, comprises two dividers of which each has two inputs. One of these inputs, when in operation, receives a voltage proportional to one of the two orthogonal components respectively of the vector being analyzed. Squaring means are connected to the respective dividers, and adder means have inputs connected to the respective two squaring means so that the added output is proportional to the sum of the two squared voltages. The analyzer further has a regulator with computer means for comparing the sum voltage with a constant reference voltage, the output of the regulator being connected to the other inputs of the two dividers. In departure from, and in addition to, the known vector analyzers, however, we provide an analyzer according to the present invention with a function generator network which comprises trigonometric-function. The generating circuitry which is connected to the respective outputs of the dividers and furnishes an output voltage proportional to the phase angle of the vector.

According to another, more specific feature of our invention, the outputs of the respective two dividers are connected with the respective first inputs of two multipliers, the difference between whose output voltages is supplied to an integrator which has its output voltage impressed upon the two other inputs of the multipliers through a sine-function generator and a cosine-function generator, respectively.

According to another, alternative feature of our invention, the output voltage of one of the dividers, added to a constant voltage magnitude of a square-root function generator, after the constant voltage magnitude insert is supplied, and the output magnitude of this function generator is supplied, in dependence upon the polarity of the other divider, either directly or through a reversing amplifier to an arcus sine-function generator.

According to still another, alternative feature of our invention, the output signal of the one divider is supplied to the dividend input of a further divider and the output signal of the other divider, in addition to a constant voltage, is supplied to the divisor input of the additional divider. The output of the latter divider is connected with the input of an arcus-tangent function generator.

According to a further feature of our invention, a technologically simple realization of the function generators, using either an arcus-sine or an arcus-tangent function generator, consists in having the function generators constituted by electronic amplifiers in hose input or negative feedback circuits there are provided one or more pre-biased threshold diodes.

The forgoing and further objects, advantages and features of our invention, said features being set forth in the claims annexed hereto, will be apparent from, and mentioned in, the following description of embodiments of the invention illustrated by way of example in the accompanying drawing, in which:

FIG. 1 is an explanatory diagram relating to the characteristic data of a vector;

FIG. 2 is a logic and circuit diagram of another embodiment which permits selectively operating with a sine-function generator and a cosine-function generator and an arcus-cosine function generator;

FIG. 3 shows a vector analyzer provided with sine and cosine-function generators;

FIG. 4 is a schematic diagram of another embodiment equipped with an arcus-tangent function generator; and FIG. 5 is a circuit diagram of a modified detail applicable in any of the embodiments of FIGS. 2 to 4.

The same reference characters are applied in all illustrations to corresponding items, respectively.

Relative to the terminology used in this specification and to the type of block diagrams shown in the accompanying drawings, reference may be had to "Feedback Control Systems" by Gille, Pelegrin and Decauline, McGraw-Hill Book Co., New York, 1959, pages 7 to 22 and 771; also to "Analysis of Feedback Control Systems" by Bruns and Saunders, McGraw-Hill Book Co, New York, 1955 pages 1 to 6, 208 and 226; and to "Elektronische Analogiegeraete" by Dietrich Ernst, published in the German periodical "Regelungstechnik", Vol. 6, 1958, Nos 3 to 6.

The orthogonal coordinate system shown in FIG. 1 with an abscissa axis $r$ and the ordinate axis $j$ represents a planar vector A which is identified by two orthogonal vector components A1 and A2. In many technological problems, particularly in the area of electrical engineering, a vectorial magnitude is predetermined or given in this form. This is the case, for example, when representing a rotary-field indicator in electrical rotating-field machines. Our invention solves the problem to obtain from the two vector components A1 and A2 a magnitude that is proportional to the phase angle $\alpha$ of the vector A. The vector analyzer according to the invention illustrated in FIG. 2 affords selectively an operation in two different ways, depending upon the selected setting of two switches or jumpers 12 and 13.

The upper portion of FIG. 2 shows a block diagram of the vector analyzer proper. It comprises two dividers 1 and 2. The dividend inputs are connected through respective terminals 3 and 4 with voltages A1 and A2 which are proportional to the orthogonal components of the vector A (FIG. 1). The outputs of the dividers 1 and 2 are squared with the aid of two multipliers 5 and 6 whose output magnitudes are added to each other in a mixer member 7. The input of this mixer member 7 is further supplied in the subtractive sense with a constant voltage E. This voltage is to have the magnitude 1, that is, this voltage is a so-called unit voltage. The output of the mixing member 7 is applied to an integrator 8 in the form of a PI-regulator whose output is connected with the divisor inputs of the dividers 1 and 2. For stability reasons, the integrator is given a stop or limit means which limit the integrator output voltage unilaterally to zero so that it will conduct only positive values of this output voltage. A properly poled diode may be used as such a unilateral stop.

Denoting the output magnitude of the PI-regulator 8 by $x$ and considering the known fact that the output magnitude of a PI-regulator will cease changing only when the sum of its input magnitudes vanishes, then the regulating circuit so far described reaches its stationary, i.e. equalizer state when the following equation is met:

$$(A_1/x)^2 + (A_2/x)^2 = E^2 = 1$$

Under these conditions, the output magnitude of the integrator 8 corresponds exactly to the scalar (absolute) amount A of the vector A. In this automatically occurring stationary state, the voltages at the respective outputs of the dividers 1 and 2 have the magnitudes $$A_1/|A| = \cos \alpha \text{ and } A_2/|A| = \sin \alpha$$

Consequently, voltages appear at the output terminals 9, 10 and 11 of the vector analyzer which are proportional respectively to the scalar amount of the vector A (terminal 9), to the sine of its phase angle $\alpha$ (terminal 10) and to the cosine of its phase angle $\alpha$ (terminal 11).

When the outputs of the dividers 1 and 2, in the illustrated vertical position of the two switching bridges or jumpers 12 and 13 are connected with the circuitry shown at the left of a broken line I, then the first inputs of two multipliers 14 and 15 are supplied with voltage proportional to the sine and the cosine respectively of the phase angle $\alpha$. The outputs of the two multipliers 14 and 15 are subtracted from each other in a mixer member 16. The output of the member 16 which, like the mixer member 7, may consist of an adding amplifier, is connected to the input of an integrator 17 which, in turn, supplies voltage to the second input of the multiplier 14 through a cosine-function generator 18 and to the second input of the multiplier 15 through a sine-function generator 19. Denoting the output magnitude of the integrator 17 by y and again taking into account that the integrator output magnitude will stop changing only when its input magnitude vanishes, then the stationary stage automatically set up as a result of the regulation, satisfies the condition $\sin \alpha \cos y - \cos \alpha \sin y = 0$. This requirement is met only when $y = \alpha$. Hence, the voltage at the output terminal 20 is directly proportional to the phase angle $\alpha$.

When the switches or jumpers 12 and 13 are moved to the horizontal positions indicated by broken lines in FIG. 2, then the circuitry illustrated at the right of the broken line I becomes effective and likewise operates to determine the phase angle $\alpha$. The output magnitude of the divider 1 is added to a constant unit voltage E, having a value 1, the addition being effected in the mixer member 21. The resulting sum voltage is supplied to a proportional amplifier 22 having an amplifying factor or gain of 0.5. In practice, the mixer member 21 may be constituted by the input circuitry of the amplifier 22, which in this case is designed as an adding amplifier.

The other mixing member 7 or 16 shown in FIG. 2 may analogously be included in the input circuitry of the next following circuit members. The output voltage of the amplifier 22 is supplied to a square-root function generator 23, that is, the output magnitude a and the input magnitude e of the function generator 23 are related as $a = \sqrt{e}$. Due to the known relation between the cosine of an angle and the cosine of the doubled angle, the voltage appearing at the output of the function generator 23 is proportional to $\cos \alpha/2$ and always has a positive polarity or sign.

The output of the other divider 2, at which the voltage proportional to the sine of the phase angle $\alpha$ appears, has its input sign connected to a limit value indicator 24 whose output provides a constant positive voltage when the output voltage of the divider is positive, whereas the output voltage of the limit value indicator 24 disappears if the output voltage from the divider 2 is negative. The output signal of the limit value indicator 24 directly indicates a switch 25 and acts through a reversing stage 26 to actuate another switch 27.

The reversing stage 26 is supposed to have a positive constant signal at its output, when the input voltage is zero, whereas the output voltage of stage 26 is zero as long as its input voltage has a value differing from zero. If the limit value indicator has two antivalent outputs, then such an output can assume the function of the reversing stage. If one looks at the state in which the output voltage of the divider 2 has a positive value, it will be seen that under this condition the switch 25 is actuated by the output voltage of the limit value indicator 24.

Depending upon the polarity of the output signal of the divider 2, that is, depending upon the sign (+, −) of the function sine $\alpha$, the output magnitude of the square-root function generator 23 is connected either directly through the switch 25 or through a polarity reversing amplifier 28 to the input of an arcus-cosine function generator 29. This affords representing by a corresponding voltage, the angle $\alpha/2$ throughout a range of 0° to 180°, or when doubling the output magnitude of the function generator 29 with the aid of an amplifier 30, the phase angle $\alpha$ can thus be represented by a voltage throughout a range of 0° to 360°. Hence, with this modification of the apparatus, the voltage directly proportional to the phase angle $\alpha$ can be taken from the output terminal 31.

Modules known from and available for the analogue computing technique are applicable for realizing the arcus-cosine function generator 29 in the form of hardware, and the circuitry or hardware needed for the other function generators 18, 19 and 23. The function generator 29 has between its output magnitude $a$ and its input magnitude $e$ the relation graphically indicated in the block diagram, that is, $a = \text{arc cos } e$. These modules, for example, comprise electronic amplifiers with several pre-biased threshold diodes in the input or negative feedback circuit. With an increasing input or output voltage, the individual biased threshold diodes, such as Zener diodes, will sequentially conduct and thus change the inclination of the amplifier characteristic to the desired extent. By using a sufficiently large number of such threshold diodes, the desired function can be approached at any desired degree of accuracy. It is further possible to realize in practice the multipliers 5 and 6 by electronic amplifiers with biased threshold diodes in the input circuit, taking into account that the relation between the output magnitude $a$ and the input magnitude $e$ in this case is $a = e^2$.

A more detailed illustration of circuitry for the portion of the equipment comprising the elements 1 through 8 (FIG. 2) is shown in FIG. 3. The reference characters of FIG. 3 correspond to those of FIG. 2. In FIG. 3, the input terminals 3 and 4 are impressed by two voltages corresponding to the respective orthogonal components of the vector. The voltages applied to the input terminals 3 and 4 are supplied to respective amplifiers 34 and 35 which are feedback-connected through respective multipliers 32 and 33 and which under no-load conditions exhibit a high amplifying gain. The feedback-connected amplifiers 35 and 34 operate as dividers.

The output voltages of the amplifiers 34 and 35 are squared in two further multipliers 5 and 6, respectively. The output voltages of the multipliers 5 and 6, together with a constant direct voltage of a magnitude $-N^2$ are applied to the input of the adding amplifier 7 which acts upon the input of a PI-regulator 8. A limit member 36 is provided at the output of the PI-amplifier, for example, in the form of a conventional limiting diode, such a Zener diode, by which the output voltage of the regulator is unilaterally limited to zero.

The output voltage of the PI-amplifier 8 acts upon the other inputs of the two multipliers 32 and 33. At the output voltage 9, as already explained with reference to FIG. 2, there appears a voltage which is proportional to the scalar amount of the vector A formed by two orthogonal components A1, A2 whose amounts correspond to the voltages applied to the input terminals 3 and 4 of the equipment. The output voltages of the amplifiers 34 and 35 are supplied to two negatively feedback-connected reversing amplifiers 37 and 38 whose feedback resistances relative to their input resistance have the ratio 1:N. Under these conditions, there appear at the terminals 10 and 11 respective voltages that correspond to the sine and the cosine of the phase angle $\alpha$ and which may be looked upon as being the component of a unit vector which always points in the direction of the vector A.

The modification shown in FIG. 3 has the advantage that it offers a free selection of the constant voltage supplied to the adding amplifier 7, provided the departure of this voltage from the value 1 is taken into account by a correspondingly dimensioned resistance ratio between input and negative feedback resistances in the reversing amplifiers 38 and 37.

The embodiment of FIG. 4 is only partially illustrated by assuming that the non-illustrated portion corresponds to the corresponding portion of FIG. 2. That is, the terminals 39 and 40 of FIG. 4 are connected, as in the embodiment of FIG. 2, to the outputs of the respective dividers 1 and 2, so that a voltage appears at the terminal 39 which corresponds to the sine of the phase angle $\alpha$, whereas the voltage at the terminal 40 corresponds to the cosine of the same angle. A constant unit voltage having a magnitude of 1 is added in a mixing member 41, and the sum is supplied to the divisor input of the divider 42 whose dividend input is connected to the terminal 39.

A voltage appears at the output of the divider 42 which is proportional to tan $\alpha/2$. This system is further provided with an arcus-tangent function generator 43, the relation between its input magnitude $e$ and output magnitude $a$ being $a = $ arc tan $e$. The function generator 43 converts the output voltage of the divider 42 to a voltage proportional to the angle $\alpha/2$. The latter voltage is amplified to twice its value in the next-following amplifier 44. Consequently, the output of the amplifier 44 is directly proportional to the phase angle $\alpha$ and is available at the output terminal 45.

The modification illustrated in FIG. 4, compared with the right-hand portion of FIG. 2, has the advantage of avoiding the need for a square-root forming function generator, which in the vicinity of the zero point can furnish only approximate function values.

FIG. 5 shows an embodiment of an amplifier with Zener diodes in a negative feedback circuit and in the input circuit.

Upon a study of this disclosure it will be obvious to those skilled in the art, that our invention permits of various modifications and may be given embodiments other than particularly illustrated and described herein, without departing from the essential features of our invention and within the scope of the claims annexed hereto.

We claim:

1. A vector analyzer comprising two dividers each having two inputs of which one divider receives when in operation a voltage proportional to one of the two orthogonal components respectively of the vector to be analyzed, squaring means connected to said respective dividers, adder means connected to said two squaring means and having an output whose voltage is proportional to the sum of the two squared voltages, a regulator having comparator means for comparing said sum voltage with a constant reference voltage and having an output whose voltages is proportional to the scalar value of the vector and which is connected to said other inputs of said two dividers, in combination with two multipliers of which each has two inputs and one of which multipliers is connected to the output of one of said respective dividers, subtractor means having two inputs connected to the respective outputs of said multipliers and having a subtractor output whose voltage is proportional to the difference between two multiplier output voltages, an integrator connected to said subtractor output and having an output voltage indicative of the vector phase angle, and trigonometric-function generator means connected to the output of said integrator.

2. In a vector analyzer according to claim 1, said function generator means comprising a sine-function generator and a cosine-function generator, said integrator having its output connected through said respective function generators to sad respective other inputs of said two multipliers.

3. In a vector analyzer according to claim 2, said integrator being an electronic PI amplifier.

4. In a vector analyzer according to claim 1, said regulator being an integral regulator.

5. In a vector analyzer according to claim 1, said function generator means comprising electronic amplifiers having input circuits and negative feedback circuits, and having voltage-biased threshold diode means in at least one of said circuits.

6. Vector analyzer comprising two dividers each having two inputs of which one divider receives when in operation a voltage proportional to one of the two orthogonal components respectively of the vector to be analyzed, squaring means connected to said respective dividers, adder means connected to said two squaring means and having an output whose voltage is proportional to the sum of the two squared voltages, a regulator having comparator means for comparing said sum voltage with a constant reference voltage and having an output whose voltage is proportional to the scalar value of the vector and which is connected to said other inputs of said two dividers, adding means connected to the output of one of said dividers for adding a constant voltage magnitude, a square-root forming function generator connected to the output of said adding means and having a generator output voltage proportional to the square root of the addition result, a reversing amplifier, an arcus-cosine function generator, and means for selectively connecting the output voltage of said square-root forming generator directly and through said reversing amplifier respectively to said arcus-cosine function in dependence upon the polarity of said other divider.

7. A vector analyzer comprising two dividers each having two inputs of which one divider receives when in operation a voltage proportional to one of the two orthogonal components respectively of the vector to be analyzed, squaring means connected to said respective dividers, adder means connected to said two squaring means and having an output whose voltage is proportional to the sum of the two squared voltages, a regulator having comparator means for comparing said sum voltage with a constant reference voltage and having an output whose voltage is proportional to the scalar value of the vector and which is connected to said other inputs of said two dividers, adding means connected to the output of one of said two dividers for adding a constant voltage to the output signal of said one of said dividers, a further divider having a dividend input and a divisor input, said dividend input being connected to the output of said other divider, said divisor input being connected to said adding means to receive the resulting sum voltage therefrom, and an arcus-tangent function generator having an input connected with the output of said further divider.

* * * * *